T. Reakirt.
Manufacture of White Lead.
Nº 89,074. Patented Apr. 20, 1869.
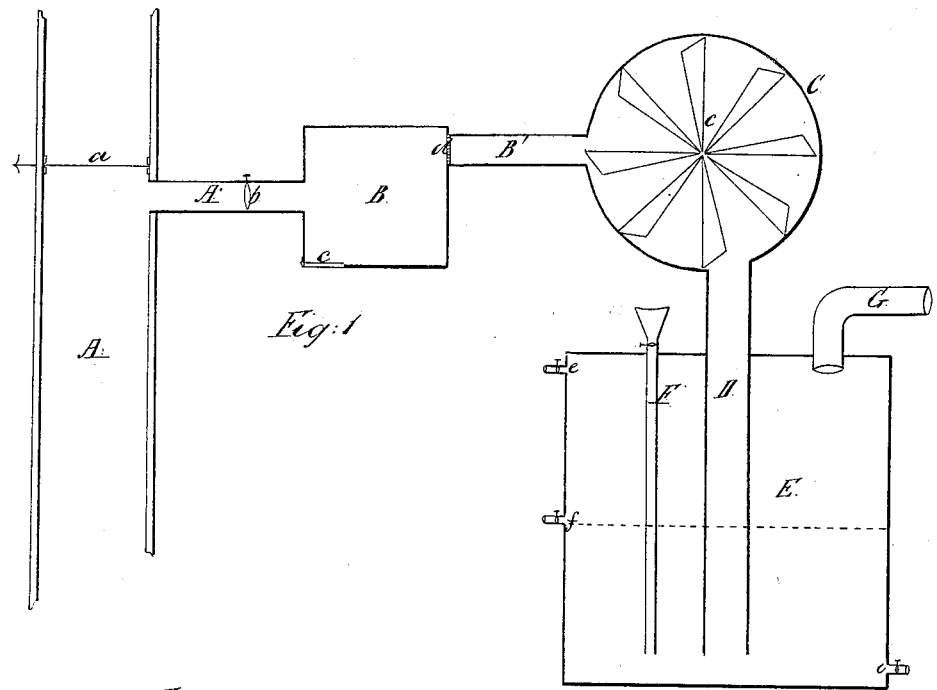
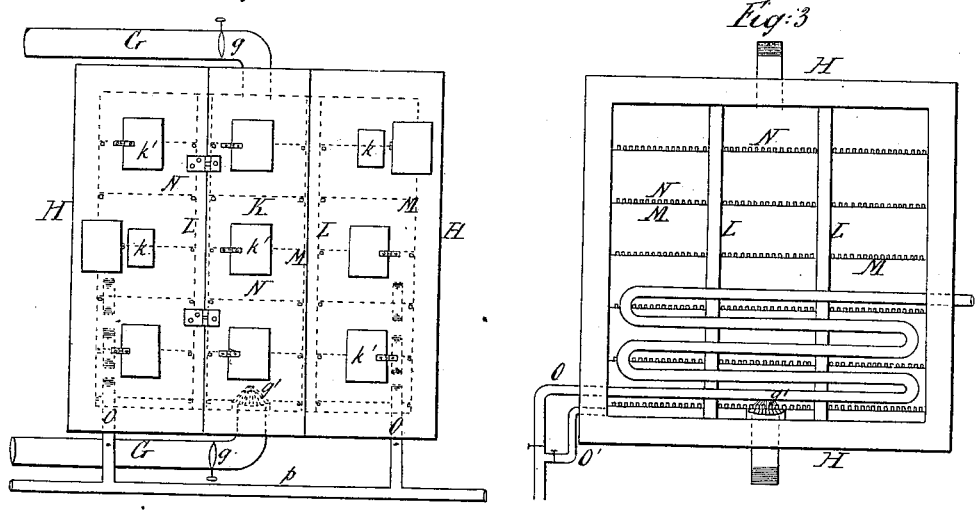
Witnesses
Edwin James
John S. Hollingshead
Inventor
Tryon Reakirt
per J. E. F. Holmead
Attorney

UNITED STATES PATENT OFFICE.

TRYON REAKIRT, OF PHILADELPHIA, PENNSYLVANIA.

Letters Patent No. 89,074, dated April 20, 1869.

IMPROVEMENT IN THE MANUFACTURE OF WHITE-LEAD.

The Schedule referred to in these Letters Patent and making part of the same.

*To all whom it may concern:*

Be it known that I, TRYON REAKIRT, of Philadelphia, in the county of Philadelphia, and State of Pennsylvania, have invented certain new and useful Improvements in the Manufacture of White-Lead; and I do hereby declare that the following is a full, clear, and exact description of the same, reference being had to the accompanying drawing, and to the letters of reference marked thereon, making part of this specification, in which—

Figure 1 is a plan view of the apparatus for purifying the carbonic-acid gas before introducing the same into the chamber.

Figure 2 is a front elevation of my apparatus for manufacturing white-lead.

Figure 3 is an open side elevation of the same.

The nature of my invention consists in subjecting metallic lead, in a closed chamber, heated to a proper temperature by confined steam, or its equivalent, simultaneously to the action of free steam, or its equivalent, to start the oxidation of the lead, and then to the action of acetic acid in the form of a spray or shower, and of carbonic-acid gas diffused throughout the chamber.

My invention also consists in the use of chlorine gas, or its equivalent, for decomposing any compounds of sulphur that may have been formed, and eliminating therefrom the sulphur, and for the purpose of bleaching any organic impurities that may be present, or removing any discoloration of the ultimate product that may arise from the presence of such impurities; also, in the use of a solution of caustic-soda, to remove any glaze upon the surface of the lead, arising from exposing it to too high a degree of temperature.

My invention also consists in the peculiar application of carbonic-acid gas, by injecting it into the chamber, through pipes passing through either the top or bottom thereof, or through both, and by this means more thoroughly diffusing the gas, and bringing the same into more perfect contact with the lead.

Carbonic-acid gas may be obtained in various ways, most purely from the decomposition of some alkaline carbonate with an acid, or the combustion of charcoal, in either manner requiring no further purification than simply washing the gas before permitting it to pass into the chamber; but it can be more economically obtained, in this connection, from the consumption of the fuel, coal or coke, used in operating the machinery necessary for the other parts of the process.

In this case, the purification becomes more difficult from the presence of sulphur.

When the fuel is coke, the product of a fine quality of anthracite coal, washing with water, in the usual manner, is often sufficient, and the small portion of sulphur escaping into the chamber can be removed by the use of chlorine gas, or its equivalent; but when anthracite or bituminous coal, or coke as ordinarily made, is used, such means would be wholly inadequate to this end, and a more complexed system of chemically absorbing, or reducing the noxious sulphurous vapors must be resorted to.

The gaseous products arising from the decomposition, by heat, of such compounds of sulphur as incidentally occur in the various forms of coal, are chiefly sulphydric and sulphurous acids, both highly deleterious to the product aimed at, white-lead.

My invention, therefore, for removing these deleterious products from the current of carbonic-acid gas, before passing the same into the chamber, consists in forcing the whole gaseous product through solutions of hypochlorous or chlorine acids, or their equivalents, or acidulated solutions of nitrates of lead and copper.

Experiments have indicated these acids to be the best for the purpose required, but more especially the first, since it and chloric acid, which is a result of the former's decomposition, alone completely decompose both sulphydric and sulphurous acids.

If these acids are not readily obtainable, some of their soluble salts will answer.

To enable others skilled in the art to make and use my invention, I will now proceed to describe its operation, with the apparatus therefor.

A is the chimney, from which the gases are taken $a$ is a damper, extending across the chimney, to prevent the gases from escaping into the open air.

A' is a tube a little below the damper $a$, and connecting the chimney A with the reservoir B.

This tube is provided with a valve, $b$, about midway between the chimney and reservoir, by which the flow of gas may be regulated.

B is a reservoir for receiving the gas, and is provided with two openings, one, $c$, at the bottom, for the purpose of cleansing the same, and the other, $d$, at the side, in which is fitted the tube B', which connects the reservoir with the circular fan-chamber C.

The opening $c$ is provided with a slide or door, by means of which it is closed, while across the opening $d$ is a screen, for the purpose of separating the gas from the dust and other refuse matter which might clog the fan $e$.

The fan-chamber C is circular in form, and is connected on one side with the reservoir B, by means of the tube B', and on its under side with the purifying-tank, by means of the tube D.

Within the circular chamber C is a fan, $e$, which, being caused to revolve rapidly, forces a large quantity of gas to enter the tube D.

This tube D passes through the centre of the top, and extends nearly to the bottom of the purifying-tank E.

E is the tank, in which the gas is purified before being carried into the chamber.

F is a funnelled tube, which extends from a short distance above the top of the tank E, through the same nearly to the bottom.

Through this funnelled tube F the purifying liquor is poured.

On one side of the tank E are inserted two small tubes, e f, each provided with a stop-cock.

The upper tube e is near the top of the tank, and is for the purpose of abstracting the carbonic-acid gas for other uses, such as washing, &c.

The other tube f is about midway of the tank, and is for the purpose of regulating the height of the fluid.

On the other side of the tank, and near its bottom, is inserted another small tube, i, also provided with a stop-cock, and which is used for the purpose of drawing off the impure fluid and deposits.

In the top of the tank E there is also inserted the pipe G, which connects with the chamber H, in which the white-lead is manufactured, and through which the purified carbonic-acid gas is conveyed.

This pipe is provided with a valve, g, by means of which the flow of gas is regulated.

H is the chamber, in which the white-lead is to be manufactured.

This chamber may be constructed with double walls, top and bottom, as shown in the drawing, with the intervening spaces filled, to produce a gas-tight chamber, or they may be single, in which case the interior should be lined with some metal, or other substance, non-corrodible by the materials to be used therein.

In the front of the chamber H there is a door, K, made to fit perfectly tight, of equal height with the chamber, and about one-third the width.

In this door, and also at suitable distances in the walls of the chamber, are small openings k k, through which are introduced the acetic acid, chlorine, and caustic-soda.

These openings k k are provided with tightly-closing doors k' k'.

Within the chamber H, at suitable distances apart, are erected wooden uprights L L.

To these uprights are fastened, at suitable intervals, horizontal bars M M, which support the small loose slats N N, upon which the pieces of scrap-lead are placed.

O O are the pipes, in which is introduced the confined steam, by means of which the chamber is heated. These pipes range along the sides of the chamber, being galvanized, or otherwise protected from the action of the materials in the chamber.

To these pipes O O, and outside of the chamber, are attached other pipes, O' O', by means of which the free steam is introduced into the chamber.

P is the main pipe, by means of which the steam is supplied from the boiler, or other apparatus, to the pipes O O and O' O'.

Over the mouth of the pipe G, at the bottom of the chamber, a raised shield, g', is placed, to prevent the solid materials in the chamber falling into the pipe.

This shield is sufficiently far above the mouth not to interfere with the introduction of the carbonic-acid gas.

The operation is as follows:

Metallic lead, in thin scraps, strips, or sheets, is placed upon the slats N N. The room is then charged with free steam, being at the same time heated with confined steam, to start the oxidation of the lead. Then the lead is sprinkled with dilute acetic acid, in a spray or shower, thereby forming an acetate of lead.

Simultaneously with this operation, the temperature of the room is increased by the steam-pipes, or other heating-apparatus, to about 110° Fahrenheit, and maintained thereat during the rest of the operation.

After the first spraying of the acetic acid, the carbonic-acid gas is introduced through the pipes G G, decomposing the acetate, and forming the carbonate of lead.

The spraying of the dilute acetic acid is to be repeated at different times, as often as the lead may require it, but the carbonic-acid gas may be continuously introduced, after the first spraying of the dilute acetic acid.

The white-lead, after removal from the chamber, and separation, by sifting, from the scraps, or uncorroded lead, is ground and elutriated by the ordinary methods used in this manufacture.

During the washing, and while being agitated in the washers, it is subjected to the action of carbonic-acid gas, or its equivalent, passed into the water, for the purpose of decomposing any acetate of lead which may have been formed in the corroding-chamber, and precipitating as carbonate the lead thus held in solution, as well as to supply the loss of any carbonic-acid gas which may have been evolved and separated from the oxide of lead during this process; then to the action of either chlorine gas, hypochlorous acid, chloride of soda, or their equivalents, to remove any last remaining trace of sulphur, as well as to render the product whiter.

The white-lead, after settling, is drawn off and dried in the usual manner.

The various liquors introduced should be heated to about 120° Fahrenheit, and may be sprayed through a rose, or showered down through small perforations, or apertures in the top.

At any time during the process of manufacture, when the lead indicates the presence of sulphur, the chlorine gas should be introduced, and when the lead shows a glaze upon its surface, the solution of caustic soda should be injected.

Should the contents of the room at any time become too dry, and if, from the progress of corrosion, it be not desirable to sprinkle with acetic acid, free steam may again be advantageously used to moisten them.

The heating of the chamber by steam-pipes, or other apparatus, is to preserve a uniform high temperature, without the superabundant moisture arising from the use of free steam to make and preserve the temperature, and which much retards the process.

The solutions of hypochlorous or chloric acids, or their equivalents, or acidulated solutions of nitrates of lead and copper may be very dilute, but their strength must necessarily depend upon the amount of sulphur present in the coal.

Of the acids, probably one quart to twenty gallons; of the salines, one pound of either, acidulated with one-quarter of a pound of nitric acid, and dissolved in five gallons of water, will generally answer the purpose.

Other solutions which may be used, but are less reliable and subject to greater inconvenience, are bi-chromate potassa and sulphate of copper, slightly acidulated with sulphuric acid and salts of peroxide of iron.

I do not confine myself to the form and manner of the foregoing-described apparatus, or any portion thereof, as it may be varied without altering any specific claims, except as hereinbefore expressly set forth.

Having thus fully described my invention,

What I claim therein as new, and desire to secure by Letters Patent of the United States, is—

1. Subjecting metallic lead, in a closed chamber, heated to a proper temperature by confined steam, or other heating-apparatus, simultaneously to the action of free steam, or its equivalent, to start the oxidation of the lead, and then to the action of acetic acid, in the form of a spray, or shower, and of carbonic-acid gas, diffused through the chamber substantially as described.

2. The use of chlorine gas and solution of caustic-soda, substantially as described as and for the purpose specified.

3. The peculiar application of the carbonic-acid gas, by injecting it into the chamber, through pipes passing through either the top or bottom thereof, or through both, and thus securing a more perfect diffusion of the gas throughout the chamber, and bringing it into more perfect contact with the lead, substantially as described.

4. The use of carbonic acid and chlorine gases, or chloride of soda, or their equivalents, in and during the process of washing the lead, substantially as described, as and for the purpose specified.

5. Purifying carbonic-acid gas arising from the combustion of fuel, by passing the same through water, holding in solution hypochlorous or chloric acid, or the other substances previously named, substantially as described, as and for the purpose specified.

In testimony whereof, I have signed my name to this specification, in the presence of two subscribing witnesses.

TRYON REAKIRT.

Witnesses:
J. P. DELENEY,
WM. J. DOYLE.